Patented Sept. 16, 1930

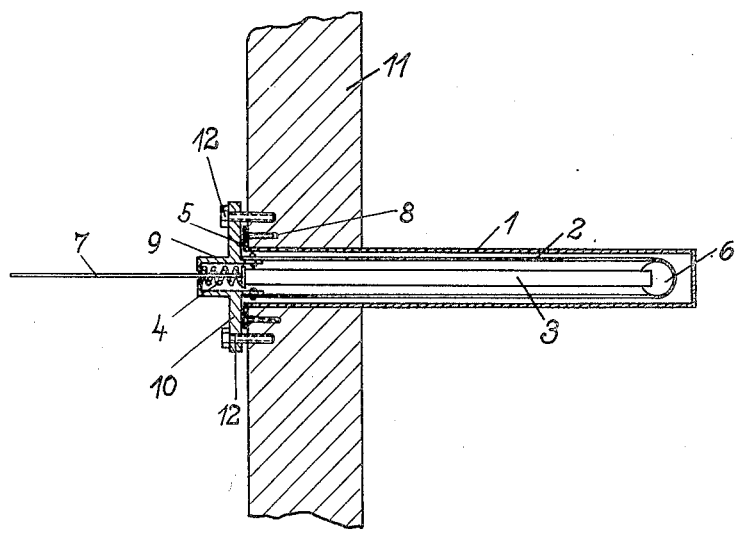

1,776,240

UNITED STATES PATENT OFFICE

GUIDO WÜNSCH, OF STEGLITZ, NEAR BERLIN, GERMANY

THERMOSTAT

Application filed July 9, 1929, Serial No. 376,967, and in Germany July 7, 1928.

The use of the known thermostats based on the expansion of a body for purposes of temperature regulation has the disadvantage that it has been impossible to effect a replacement without at the same time stopping the working of the apparatus. Such thermostats generally have been inserted in a flange of the pipe in which the temperature had to be measured and when the pipe carried for instance liquid, steam, gas, or the like, it was necessary to put the pipe out of action as an opening was produced in the pipe when the thermostats were being replaced.

It has already been proposed to insert into the opening a tube which encloses the thermostat proper, but which always remains in the space the temperature of which is to be measured, even when the thermostat is replaced. In this way the thermostat can be replaced without interfering with the working since the measuring tube closes the opening in the body.

In the existing forms of such thermostats which are chiefly constituted by a tube, such a considerable insulation would be produced by the protective sleeve that the thermostat would work too slowly. This fault is avoided by the present invention by using the thermostat in the form of a very thin steel band namely of a thickness of a few hundredths of a millimeter and of a width of a few millimeters or in the form of steel wires or the like.

The accompanying drawing shows by way of example a construction according to the invention in section.

In any desired chamber, in a pipe or the like 11 which is indicated in the drawing by cross hatching, the protective tube 1 is inserted. A flange 5 is used for holding the tube which flange is secured for example by screws 8 to the wall of the chamber in which the measurement is to be effected. The thermostat proper, which is fitted into the protective tube 1 comprises a body 9 having a flange 10 which closely adjoins the flange 5, and may be replaceably connected with the said flange 5 or the wall 11 by means of screw-bolts 12. The sensitive part of the thermostat is chiefly constituted by a steel band 2 which is very thin, preferably less than 0.1 mm. and the width of which amounts to only a few millimeters. The band is secured with both its ends to the body 9 of the thermostat and its central part passes over a saddle-shaped support 6. This support is arranged on a rod 3 with which a spring 4 engages so that the rod or the support 6 is always held in such a manner as to keep the steel band 2 taut. The rod 3 is made of a material such as for instance quartz, which does not expand at all or at least not to a perceptible degree in heat. The expansion of the steel band under the action of heat is then transmitted in the usual manner through the rod 3 and the rod 7 fixed on rod 3 to the device operated by the thermostat. This may be for instance a pointer device, a writing device, a regulating device or the like.

The essential point is that the thermostat has an exceedingly small mass which, in spite of the protective tube 1, reacts sufficiently quickly to fluctuations of heat. Owing to the arrangement of the protective tube which protects the thermostat from mechanical injury, it is possible to use thin sensitive material.

I claim:—

1. A thermostat comprising, in combination, a thin metal strip arranged in the form of a U, a thermostat body to which the ends of said strip are connected, means arranged on said body adapted to hold the strip taut comprising a rod of a material having a relatively low coefficient of expansion, said rod engaging the closed end of said U-formed strip, means connected with said rod for transmitting the expansion of said strip and a protective tube adapted to be fitted into an opening of the container in which the measurement is being effected and in which the said body is replaceably inserted.

2. A thermostat comprising, in combination, a thin metal strip arranged in the form of a U, a thermostat body to which the ends of said strip are connected, means arranged on said body adapted to hold the strip taut comprising a rod of a material having a relatively low coefficient of expansion, said rod engaging the closed end of said U-formed strip and a spring pressing said rod against the central portion of the strip, means connected with said rod for transmitting the expansion of said strip and a protective tube adapted to be fitted into an opening of the container in which the measurement is being effected and in which the said body is replaceably inserted.

In testimony whereof I affix my signature.

GUIDO WÜNSCH.